March 3, 1970 H. SEIBT 3,498,432
POWER TRAIN FOR A MOTORCYCLE AND THE LIKE
Filed Feb. 29, 1968 2 Sheets-Sheet 2
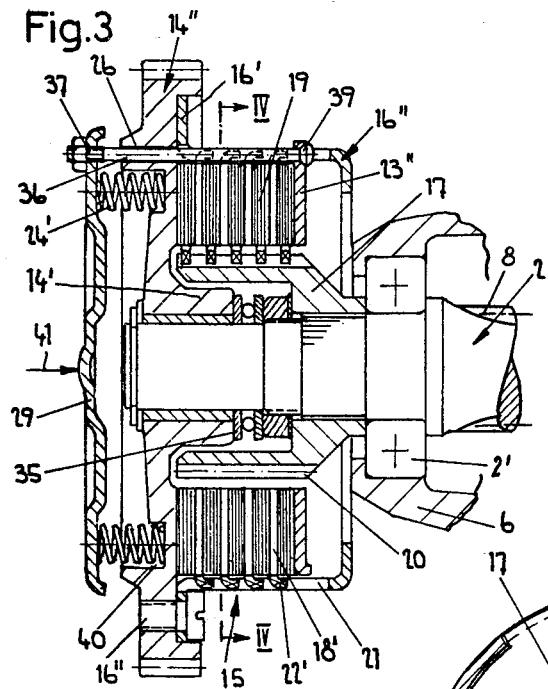
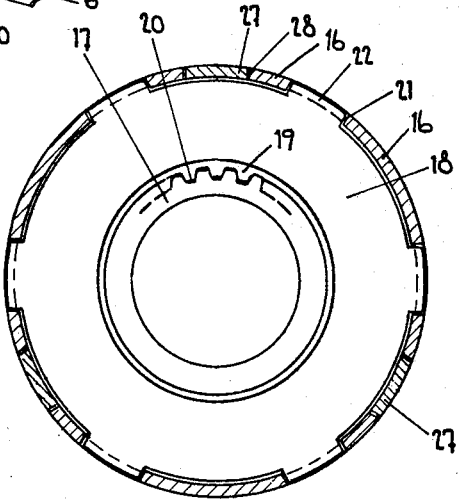
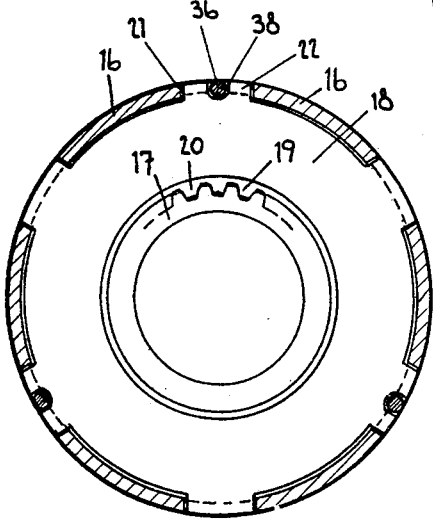
INVENTOR
Hans Seibt
By: Low and Berman
Agents

United States Patent Office 3,498,432
Patented Mar. 3, 1970

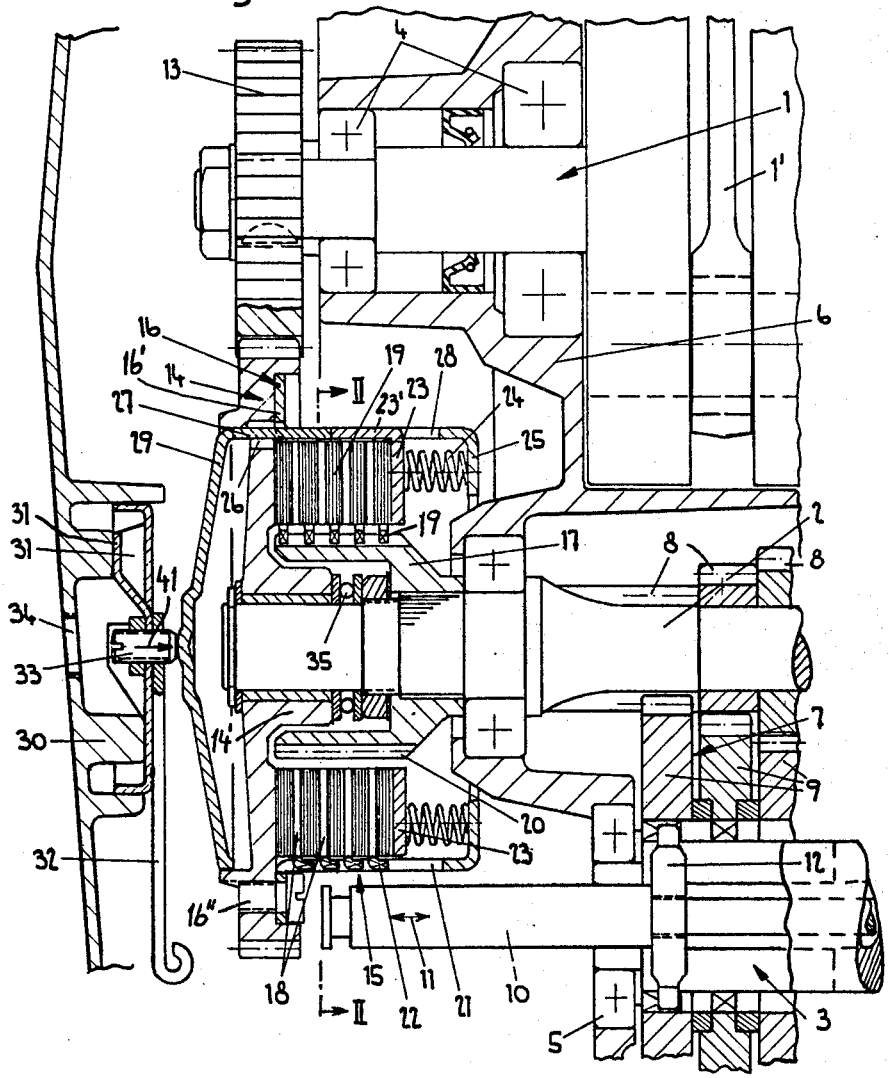

3,498,432
POWER TRAIN FOR A MOTORCYCLE AND THE LIKE
Hans Seibt, Schweinfurt (Main), Germany, assignor to Fichtel & Sachs Aktiengesellschaft
Filed Feb. 29, 1968, Ser. No. 709,265
Claims priority, application Germany, Mar. 7, 1967, F 51,744
Int. Cl. F16d 13/54
U.S. Cl. 192—70.23
6 Claims

ABSTRACT OF THE DISCLOSURE

A power train for a motorcycle with parallel input, clutch, and transmission output shafts, the input and clutch shafts being connected by meshing gears in a first radial plane, and the clutch and output shafts by a selected one of three pairs of meshing gears in a second radial plane, and the shafts being partly axially coextensive between the planes. The single gear coaxially associated with the clutch disc in the first radial plane carries a clutch casing, and the driven and driving discs of the clutch are respectively secured to the casing and clutch shaft against rotation. The gear ratio between the gear and output shafts is changed by shfting a coupling member in a slot of the output shaft between engagement with recesses in the several gears on the output shaft.

BACKGROUND OF THE INVENTION

This invention relates to a power train for motorcycles and other automotive vehicles having internal combustion engines of relatively small displacement, and more specifically to a multiple-disc clutch for such a power train and its structural relationship to other elements of the power train.

The clutch and multiple-speed transmission for a motorcycle and similar vehicle must be compact. A power train for a lightweight motorcycle, scooter, or bicycle with auxiliary motor must also be capable of simple assembly in order to reduce the cost. Still, the power train must be durable and capable of operating without undue noise.

The object of the invention is the provision of a power train which meets these requirements.

SUMMARY OF THE INVENTION

With this object and others in view, as will hereinafter become apparent, the invention provides a power train whose input shaft, multiple speed transmission and clutch are arranged on a common support. The clutch includes a clutch shaft and a clutch wheel which is mounted on the support for rotation about the axis of the clutch shaft. The wheel is circumferentially engaged by a motion transmitting element which transmits rotation from the input shaft to the wheel, and the latter carries a fixedly fastened clutch casing. The driving and driven discs of the clutch form a stack in the casing and are respectively secured against rotation relative to the casing and to a carrier which is similarly secured to a portion of the clutch shaft axially coextensive with the casing. When the stack is axially compressed, power is transmitted from the driven clutch wheel to the clutch shaft, and thence to the transmission. The pressure device which normally compresses the stack may be released by a clutch release mechanism.

Other features and many of the attendant advantages of this invention will readily be appreciated as the same becomes better understood by reference to the following detailed description when considered in connection with the accompanying drawing.

BRIEF DESCRIPTION OF THE DRAWING

In the drawing:
FIG. 1 shows as much of a motorcycle as is necessary for an understanding of the invention, the view being in side-elevational section on the median plane of the vehicle;
FIG. 2 illustrates a portion of the apparatus of FIG. 1 in front elevational section on the line II—II;
FIG. 3 shows a modification of the apparatus of FIG. 1 in a corresponding, but fragmentary view; and
FIG. 4 shows the device of FIG. 3 in section on the line IV—IV.

DETAILED DESCRIPTION OF THE PREFERRED EMBODIMENTS

Referring now to the drawing in detail, and initially to FIGS. 1 and 2, there is shown a portion of the engine and power train of a light motorcycle, not otherwise shown. A crankshaft 1 of the cycle engine, a clutch shaft 2 and a transmission output shaft 3 are parallel and arranged in a common axial plane one under the other. The crankshaft 1 carries a connecting rod 1' of the cycle engine, not otherwise shown. Bearings 4 for the crankshaft 1, 2' for the clutch shaft 2, and 5 for the transmission output shaft 3 are mounted on the housing 6 which encloses and supports the illustrated portion of the power train which includes a three-speed transmission 7.

The transmission has three pairs of meshing gears 8, 9 on the rear end of the clutch shaft 2 and on the output shaft 3 respectively. The gears 8 are splined to the clutch shaft 2, whereas the gears 9 are normally freely rotatable on the output shaft 3. The three gears on each shaft 2, 3 are of different diameter, and the gear ratio of the transmission 7 is changed by moving a pull rod 10 which forwardly projects from an axial bore of the shaft 3, as indicated by an arrow 11. A coupling pin 12 attached to the rod 11 moves in an axial slot of the shaft 3 communicating with the aforementioned bore, and radially projects from the slot for selective engagement with conforming grooves in the gears 9, only one of the gears 9 being thereby coupled to the shaft 3 at any one time.

The front end of the crankshaft 1, which is the input shaft of the power train, carries a gear 13 meshingly engaged with a circumferential gear rim on a wheel 14 whose hub 14' is axially secured, but freely rotatable on the front end of the clutch shaft 2. The wheel 14 is normally coupled to the shaft 2 by a stack 15 of clutch discs arranged in a cylindrical clutch casing 16. The casing is fixedly fastened to the wheel 14 by a flange 16' on the casing and by bolts 16" of which only one is seen in the drawing.

An approximately cup-shaped carrier sleeve 17 spacedly and coaxially envelops the hub 14' in the casing 16, and the bottom of the sleeve 17 is axially separated from the hub 14' by a thrust bearing 35. The stack 15 consists of axially alternating driving clutch discs 18 and driven clutch discs 19. The latter conformingly engage the grooves between axial ribs or splines 20 on the carrier sleeve 17 which permit axial movement of the discs 19, but secure them against angular displacement relative to the clutch shaft 2. Axial slots 21 in the casing 16 are similarly engaged by radially projecting lugs 22 on the driving discs 18. The free ends of the lugs 22 are angularly bent into an axial direction to provide a greater area of power transmitting contact with the casing 16.

The stack 15 is axially interposed between the radial rear face of the wheel 14 and a flat, annular pressure plate 23 equipped with radially projecting lugs 23'. Helical clutch springs 24 are arranged axially between the pressure plate 23 and an internal abutment flange 25 at the rear end of the casing 16.

Three circumferentially elongated openings 26 pass axially through the wheel 14 in a common circle about the axis of the shaft 2 and slidably receive respective flat linkage bars 27 which extend through the openings 26 into aligned axial slots 28 of the clutch casing 16 which also receive the forwardly bent lugs 23' of the pressure plate 23, the lugs 23' axially engaging the linkage bars 27 under the pressure of the clutch springs 24.

The bars 27 are integral with a dished clutch release plate 29 coaxial with the shaft 2, and held at an adjustable axial distance from the cover 30 of the housing 6 by a cam disc 31. Axially engaged cam faces 31' on the disc 31 and on the cover 30 are helical about the axis of the shaft 2, and cause the disc 31 to move axially when the disc is turned by means of a radial operating arm 32.

An abutment pin 33 threadedly mounted in the center of the disc 31 is axially aligned with an access opening 34 in the cover 30 which permits a screwdriver to be inserted into a slot in the pin 33, and the pin to be axially adjusted on the disc 31. When the arm 32 is turned to move the pin 33 in the axial direction of the arrow 41, the plate 29 is shifted rearward, and the bars 27 push the pressure plate 23 away from the stack 15 against the restraint of the springs 24, thereby disengaging the clutch and permitting the gear ratio of the transmission 7 to be changed by operating the pull rod 10, or for any other purpose usual in the operation of motor vehicles.

It will be understood that the pull rod 10 and the arm 32 are connected by Bowden cables or other linkages to pedals or control levers within reach of the rider on the motorcycle as is conventional and has not been explicitly shown.

A modified power train is shown in part in FIGS. 3 and 4, and will be understood to be identical with the apparatus of FIGS. 1 and 2 as far as not shown or specifically set forth, the modification relating to the multiple disc clutch and to its release mechanism.

The driving clutch discs 18', and more specifically three of their six lugs 22', differ from the corresponding elements described above with reference to FIGS. 1 and 2 by being provided with approximately semicircular radially open notches 38 in which cylindrical linkage rods 36 are received. The casing 16' has six longitudinal slots 21 respectively receiving the lugs 22', but lacks the afore-described slots 28.

The threaded front ends of the rods 36 pass through openings 26 in the wheel 14" and carry nuts 37 which abut against the front face of the clutch release plate 29. The clutch springs 24' which are axially interposed between the plate 29 and pockets 40 in the wheel 14" hold the nuts 37 against the plate 29, while the rear ends of the rods 36 pass through openings in the pressure plate 23", and enlarged heads 39 of the rods 36 abut against the rear face of the pressure plate.

When the clutch release plate 29 is moved in the direction of the arrow 41 in FIG. 2, the clutch springs 24' are compressed, and the clutch plates 18', 19 can move axially apart to disengage the transmission output shaft 3 from the crankshaft 1, the shafts 3, 1 not being shown in FIGS. 3 and 4. The nuts 37 permit the maximum slippage in the clutch stack 15 to be adjusted in a very simple manner, and a similar adjustment can be made by turning the pin 33 on the disc 31 in either illustrated embodiment of the invention.

The power trains of the invention are simple and consist of relatively few, sturdy elements. They operate quietly both in the engaged and disengaged condition of the multiple-disc clutch, even if the clutch discs are axially guided on the clutch casing and on the carrier sleeve with relatively great circumferential clearance which significantly reduces the cost of manufacturing the clutch because of the more generous permissible tolerances.

The power trains are quickly and conveniently assembled and disassembled because the stacks 15 may be preassembled with other clutch elements and handled as a unit during assembly, the same group of elements being readily removed as a unit during disassembly.

The operating elements of the clutch assembly are almost completely confined between two closely spaced radial planes through the power transmitting gears 13, 14 and 8, 9 respectively, and the horizontal transverse dimensions of the power train, while not specifically shown in the drawing, are obviously small. The power train fits comfortably into a bicycle frame without inconveniencing the legs of a rider.

Many modifications other than those specifically illustrated and described will readily suggest themselves to those skilled in the art on the basis of the above teachings. While meshing circumferential engagement between the wheel 14 and the gear 13 on the input shaft 1 has been specifically disclosed, other motion transmitting arrangements between the shaft 1 and the circumference of the wheel 14 may obviously be substituted under suitable conditions. A friction drive and a belt or chain drive are specifically contemplated. Similar substitutions may be made in other portions of the power train.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention.

What is claimed is:

1. In a power train for a motorcycle and like vehicle having an input shaft, a multiple-speed transmission, and a multiple-disc clutch releasably connecting said shaft to said transmission, said input shaft, transmission, and clutch being arranged on a common support, the improvement in the clutch which comprises:
   (a) a clutch shaft having an axis;
   (b) a wheel mounted for rotation about said axis;
   (c) motion transmitting means circumferentially engaging said wheel and operatively connected to said input shaft for transmitting the rotation of the same to said wheel;
   (d) a clutch casing fixedly fastened to said wheel;
   (e) a carrier secured on said clutch shaft against rotation,
      (1) a portion of said carrier being axially coextensive with said casing;
   (f) a stack of axially juxtaposed driving and driven clutch discs radially interposed between said casing and said portion of the carrier,
      (1) said driving and driven clutch disc being secured against rotation relative to said casing and to said carrier respectively;
   (g) pressure means for axially compressing said stack; and
   (h) clutch release means for releasing said stack from the pressure of said pressure means,
      (1) said wheel having a first face axially directed toward said stack, and a second face axially directed away from said stack,
      (2) said pressure means including a pressure member in said casing and yieldably resilient means biasing said pressure member toward said first face, said stack being interposed between said pressure member and said first face,
      (3) said yieldably resilient means including a compression spring abuttingly engaging said second face, and a bar member passing through said wheel and connecting said spring to said pressure member.

2. In a power train for a motorcycle and like vehicle having an input shaft, a multiple-speed transmission, and a multiple-disc clutch releasably connecting said shaft to said transmission, said input shaft, transmission, and clutch being arranged on a common support, the improvement in the clutch which comprises:
   (a) a clutch shaft having an axis;
   (b) a wheel mounted for rotation about said axis;
   (c) motion transmitting means circumferentially engaging said wheel and operatively connected to said input shaft for transmitting the rotation of the same to said wheel;

(d) a clutch casing fixedly fastened to said wheel;
(e) a carrier secured on said clutch shaft against rotation,
    (1) a portion of said carrier being axially coextensive with said casing;
(f) a stack of axially juxtaposed driving and driven clutch discs radially interposed between said casing and said portion of the carrier,
    (1) said driving and driven clutch discs being secured against rotation relative to said casing and to said carrier respectively;
(g) pressure means for axially compressing said stack; and
(h) clutch release means for releasing said stack from the pressure of said pressure means,
    (1) said wheel having a face axially directed toward said stack, and said pressure means including a pressure member in said casing and yieldably resilient means biasing said pressure member toward said face, said stack being interposed between said pressure member and said face,
    (2) said clutch release means including linkage means engaging said pressure member and extending axially through said wheel, and operating means axially offset from said wheel away from said pressure member, and engaging said linkage means,
    (3) said linkage means including a plurality of bar members susbtantially parallel to said axis, each bar member having respective end portions on opposite axial sides of said wheel, and said operating means including a plate member operatively connected to the ends of said bar members on the side of said wheel remote from said pressure member for axially moving the bar members, and means for axially moving said plate member,
    (4) said casing being axially slotted, and said bar members being received in respective slots of said casing.

3. In a power train as set forth in claim 2, said yieldably resilient means including a compression spring interposed between said plate member and said wheel, said bar members engaging said plate member, and threaded means for varying the effective length of each bar member.

4. In a power train as set forth in claim 2, said means for axially moving said plate member including a cam member mounted for rotation about said axis in simultaneous abutting engagement with said plate member and with said support, said cam member having an abuttingly engaged cam face helically shaped about said axis.

5. In a power train as set forth in claim 2, an abutment extending from said casing toward said axis and offset from said pressure member away from said face, said yieldably resilient means including a compression spring interposed between said abutment and said pressure member.

6. In a power train as set forth in claim 2, the further improvement which comprises another wheel on said input shaft engaging said first-mentioned wheel, said shafts being substantially parallel and said wheels extending in a common radial plane, said shafts extending axially away from said common plane in a common direction, said transmission including an output shaft susbtantially parallel to said input shaft and to said clutch shaft, and two gears remote from said common plane on each of said clutch and output shafts, each gear on one shaft meshingly engaging a corresponding gear on the other shaft, means securing said clutch shaft to the associated gears against rotation, and speed changing means for selectively securing one of the two gears on said output shaft to the latter against rotation, the output shaft being formed with an axial slot and an axial bore communicating with said slot, a coupling member axially slidable in said slot and radially projecting therefrom for motion transmitting engagement with corresponding recesses in the two gears in respective axial positions of the coupling member and an operating member secured to said coupling member and axially slidable in said bore, said operating member projecting axially from said output shaft in a direction from said gears toward said common plane.

References Cited
UNITED STATES PATENTS

| | | |
|---|---|---|
| 804,573 | 11/1905 | Baumgartner. |
| 1,045,688 | 11/1912 | Ellett _____ 192—70.27 X |
| 1,207,190 | 12/1916 | Mack _____ 192—70.27 X |
| 1,254,372 | 1/1918 | Stanley. |
| 1,969,993 | 8/1934 | Schmidt _____ 192—70.27 X |
| 2,060,692 | 11/1936 | Rockwell _____ 192—70.27 X |

FOREIGN PATENTS 986,444  3/1965  Great Britain.

BENJAMIN W. WYCHE III, Primary Examiner

U.S. Cl. X.R.

192—3.5, 70.25